(12) United States Patent
Guy et al.

(10) Patent No.: US 9,959,446 B2
(45) Date of Patent: May 1, 2018

(54) APPENDING A USER IDENTIFIER TO AN IMAGE

(71) Applicant: LENOVO (Singapore) PTE, LTD., New Tech Park (SG)

(72) Inventors: Spencer Michael Guy, Raleigh, NC (US); Jason Grimme, Cary, NC (US); Kyle Jared McDaniel, Morrisville, NC (US); Russell Speight VanBlon, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 195 days.

(21) Appl. No.: 14/667,358

(22) Filed: Mar. 24, 2015

(65) Prior Publication Data

US 2016/0283476 A1   Sep. 29, 2016

(51) Int. Cl.
*H04N 9/47* (2006.01)
*G06K 9/00* (2006.01)
*G06F 17/30* (2006.01)
*G06F 21/32* (2013.01)
*H04N 9/80* (2006.01)

(52) U.S. Cl.
CPC ... *G06K 9/00087* (2013.01); *G06F 17/30268* (2013.01); *G06F 21/32* (2013.01); *G06K 9/00892* (2013.01)

(58) Field of Classification Search
CPC .............. H04N 9/47; H04N 9/80; G06K 9/00
USPC ......... 382/115, 116, 117, 118; 386/241, 239; 348/77, 61
See application file for complete search history.

(56) References Cited

U.S. PATENT DOCUMENTS

| | | | |
|---|---|---|---|
| 5,592,654 A * | 1/1997 | Djakovic | G06F 3/1297 710/8 |
| 9,317,532 B2 * | 4/2016 | Lahcanski | G06F 17/30241 |
| 2009/0123035 A1 * | 5/2009 | Khouri | G06K 9/00771 382/115 |
| 2014/0337346 A1 * | 11/2014 | Barthel | G06F 17/30899 707/738 |
| 2016/0085994 A1 * | 3/2016 | Pereira | G06F 21/6272 726/26 |
| 2016/0264378 A1 * | 9/2016 | Simcik | B66B 1/468 |

* cited by examiner

*Primary Examiner* — Daquan Zhao
(74) *Attorney, Agent, or Firm* — Kunzler, PC (57) ABSTRACT

For appending a user identifier to an image, code records a user identity input from an input device in response to a principle camera recording a principle image. In addition, the code generates a user identifier from the user identity input. The code further appends the user identifier to the principle image.

12 Claims, 7 Drawing Sheets

| User Identity Input |
| --- |
| 205 |
| Input Type |
| 210 |
| User ID |
| 215 |

| | User Input 207 | Input Type 210 | User Metadata 220 |
| --- | --- | --- | --- |
| 233 | User Input 207 | Input Type 210 | User Metadata 220 |
| 233 | User Input 207 | Input Type 210 | User Metadata 220 |
| 233 | User Input 207 | Input Type 210 | User Metadata 220 |
| 233 | User Input 207 | Input Type 210 | User Metadata 220 |

| Data Store Image 275 | Image ID 280 |
|---|---|
| Data Store Image 275 | Image ID 280 |
| Data Store Image 275 | Image ID 280 |
| Data Store Image 275 | Image ID 280 |

273 points to each row.

| Image File Name 305 |
|---|
| Image Data 310 |
| Author Field 315 |

APPENDING A USER IDENTIFIER TO AN IMAGE

FIELD

The subject matter disclosed herein relates to user identifiers and more particularly relates to appending a user identifier to an image.

BACKGROUND

Description of the Related Art

Some digital image formats include an option to designate an author.

BRIEF SUMMARY

An apparatus for appending a user identifier to an image is disclosed. The apparatus includes an electronic device with an input device, a principle camera, a processor, and a memory. The memory stores code executable by the processor. The code records a user identity input from the input device in response to the principle camera recording a principle image. In addition, the code generates a user identifier from the user identity input. The code further appends the user identifier to the principle image. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
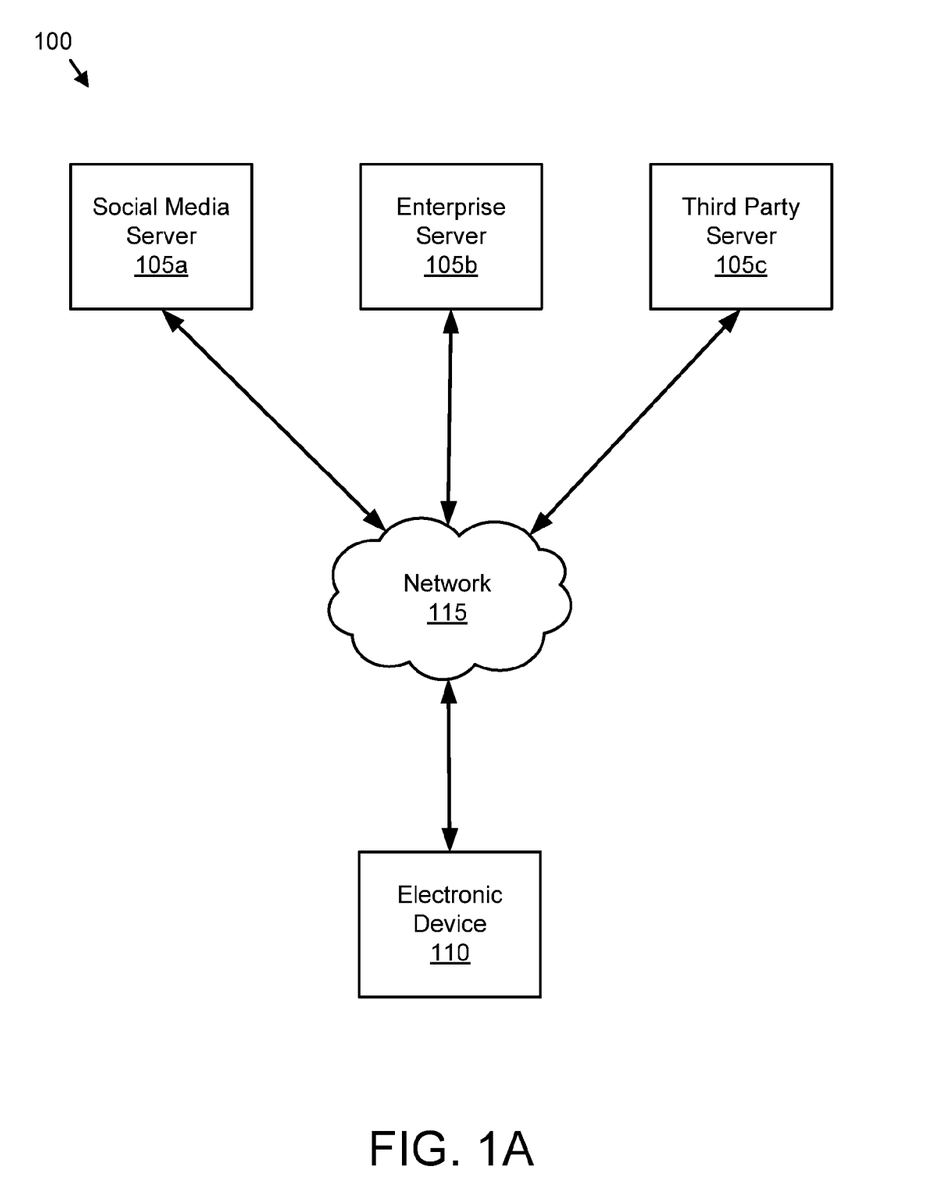
FIG. 1A is a schematic block diagram illustrating one embodiment of a user identifier system.

FIG. 1A is a schematic block diagram illustrating one embodiment of a user identifier system 100. The system 100 may generate a user identifier for user capturing an image and append the user identifier to the image. The system 100 includes one or more servers 105, an electronic device 110, and a network 115.

The electronic device 110 may be a mobile telephone, a tablet computer, a laptop computer, a computer workstation, or the like. The network 115 may be the Internet, a mobile telephone network, a Wi-Fi network, a local area network, a wide-area network, or combinations thereof. The electronic device 110 may communicate with the servers 105 through the network 115.

In the depicted embodiment, the servers 105 include a social media server 105a, an enterprise server 105b, and a third party server 105c. The social media server 105a may host a plurality of social media accounts including a social media account associated with the electronic device 110.

The enterprise server 105b may also host an account associated with the electronic device 110. The third party server 105c may store one or more databases that include information on a user of the electronic device 110.

A user may employ the electronic device 110 to record an image. For example, the user may record a still image. Alternatively, the user may record a video image. In one embodiment, the image is a document such as a word processing document, a spreadsheet, or the like. The file format of the image may include an author field. However, users rarely identify the user/author in the author field.

The embodiments described herein automatically generate a user identifier from a user identity input at the electronic device 110. In addition, the embodiments append the user identifier to an image. For example, the embodiments may append the user identifier to the author field. Alternatively, the embodiments may append the user identifier to a file name for the image. As a result, the user/author information is preserved.

Figure 1B:
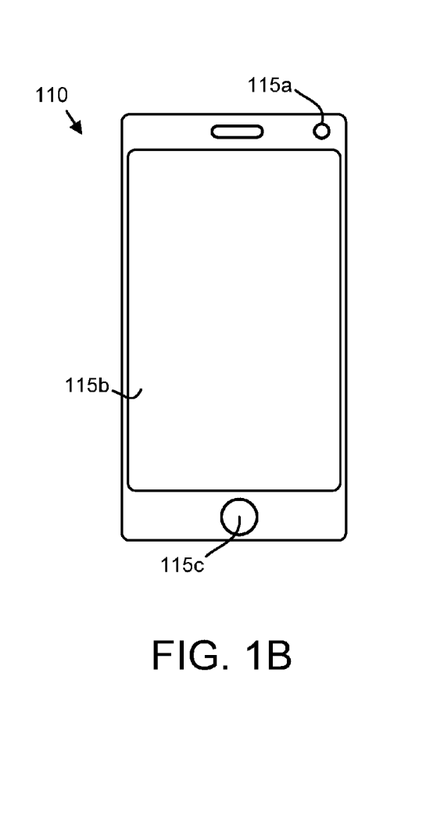
FIG. 1B is a front view drawing illustrating one embodiment of an electronic device.

FIG. 1B is a front view drawing illustrating one embodiment of an electronic device 110. In the depicted embodiment, the electronic device 110 is a mobile telephone. The mobile telephone electronic device 110 includes one or more input devices 115. The input devices 115 may be employed to record a user identity input for the user recording a principle image with the electronic device 110.

In the depicted embodiment, the electronic device 110 includes a forward camera input device 115a, a touch screen input device 115b, and a microphone input device 115c. The embodiments may be implemented with other input devices 115.

The forward camera input device 115a may record a user image of the user recording the principle image. The touch screen input device 115b may record a biometric user identity input such as a finger characteristic, an interaction characteristic, or the like. Alternatively, the touch screen input device 115b may record a pass code user identity input. The microphone input device 115c may record a biometric user identity input such as a voice print.

Figure 1C:
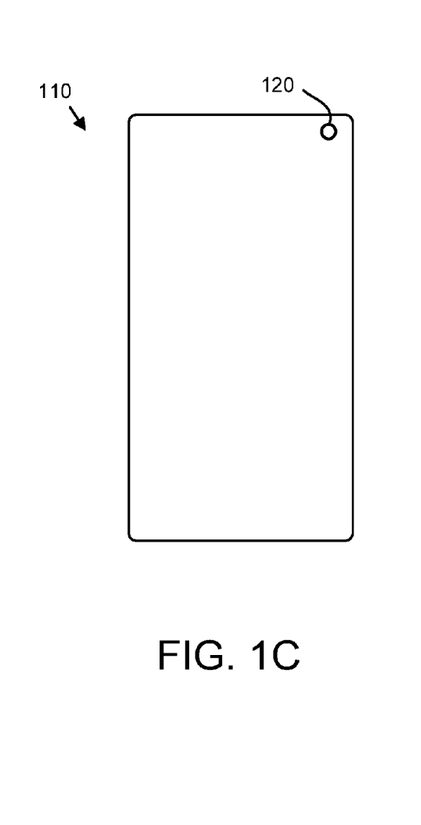
FIG. 1C is a back view drawing illustrating one embodiment of an electronic device.

FIG. 1C is a back view drawing illustrating one embodiment of an electronic device 110. The electronic device 110 of FIG. 1B is shown. In the depicted embodiment, the electronic device 110 includes a principle camera 120. The principle camera 120 may record a principle image.

Figure 2A:
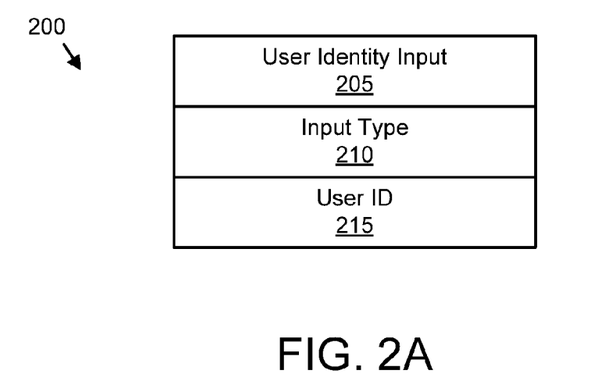
FIG. 2A is a schematic block diagram illustrating one embodiment of user data.

FIG. 2A is a schematic block diagram illustrating one embodiment of user data 200. The user data 200 maybe organized as a data structure and stored in a memory. The user data 200 may be stored on the electronic device 110. Alternatively, the user data 200 may be stored in one or more servers 105. In the depicted embodiment, the user data 200 includes a user identity input 205, an input type 210, and a user identifier 215.

The user identity input 205 may be recorded from the input device 115. The user identity input 205 may be a user image recorded by a second camera such as the forward camera input device 115a. Alternatively, the user identity input 205 may be a biometric user identity input 205 such as a fingerprint, a finger characteristic, and interaction characteristic, a retinal scan, a voice print, or the like. In one embodiment, the user identity input 205 is a pass code.

The input type 210 may specify a type of the user identity input 205. The input type 210 may specify that the user identity input 205 is one of a user image, a user biometric, a pass code, and the like. The user identifier 215 may be generated from the user identity input 205 and may identify the user that records the principle image with the principle camera 120.

Figure 2B:
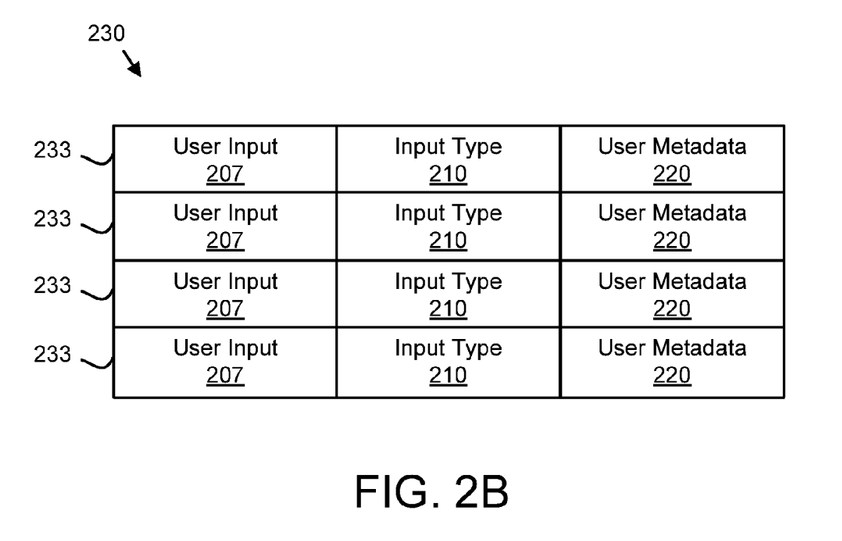
FIG. 2B is a schematic block diagram illustrating one embodiment of a user identity database.

FIG. 2B is a schematic block diagram illustrating one embodiment of a user identity database 230. The user identity database 230 maybe organized as a data structure and stored in a memory. The user identity database 230 may be stored in one or more servers 105. Alternatively, the user identity input database 230 may be stored on the electronic device 110. In the depicted embodiment, the user identity database 230 includes one or more entries 233. Each entry 233 includes a user input 207, an input type 210, and user metadata 220.

The user identity database 230 may be created for a function other than identifying a user. For example, the user identity database 230 may be part of a social media account associated with the electronic device 110. Alternatively, the user identity database 230 may be part of a public database, search engine results, an e-commerce site, or the like.

In one embodiment, the social media account associated with electronic device 110 may include a plurality of image user inputs 207. The input type 210 may be a tag or file extension that indicates that the user input 207 is an image. In addition, each image user input 207 may include user metadata 220 such as a tag, a name, or a link to a profile.

The user identity database 230 may be used to generate the user identifier 215 for a user. The user identity input 205 from the user data 200 may be matched with a user input 207 from the user identity database 230. In addition, the user metadata 220 corresponding to the user input 207 of the user identity database 230 may be retrieved to generate the user identifier 215.

Figure 2C:
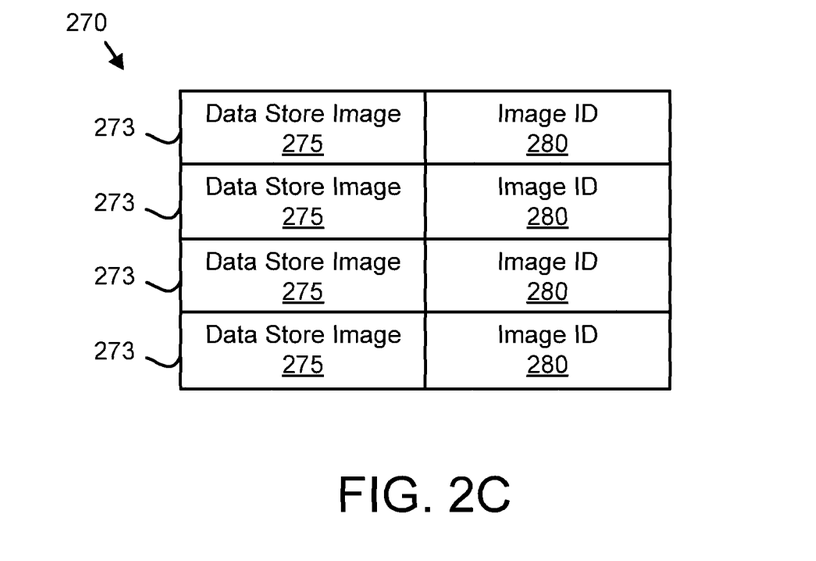
FIG. 2C is a schematic block diagram illustrating one embodiment of a user data store.

FIG. 2C is a schematic block diagram illustrating one embodiment of a user data store 270. The user data store 270 maybe organized as a data structure in a memory. The user data store 270 may be stored on the electronic device 110. Alternatively, the user data store 270 may be stored on one or more servers 105. In the depicted embodiment, the user data store 270 includes a plurality of entries 273. Each entry 273 may include a data store image 275 and an image identifier 280.

The data store image 275 may be an image stored on the electronic device 110. For example, the electronic device 110 may store a plurality of images. The data store images 275 may be sent to the electronic device 110. Each data store image 275 may be associated with an image identifier 280. In one embodiment, the image identifier 280 is in electronic address of a device that sent the data store image 275 to the electronic device 110. For example, a user may send a data store image 275 to the electronic device 110 from another device. The data store image 275 may be recorded along with an electronic address image identifier 280.

The user data store 270 may be employed to generate the user identifier 215 from the user identity input 205. In one embodiment, the electronic device 110 matches a user image user identity input 205 from the user data 200 with a data store image 275. The electronic device 110 may further retrieve the image identifier 280 as the user identifier 215.

Figure 3:
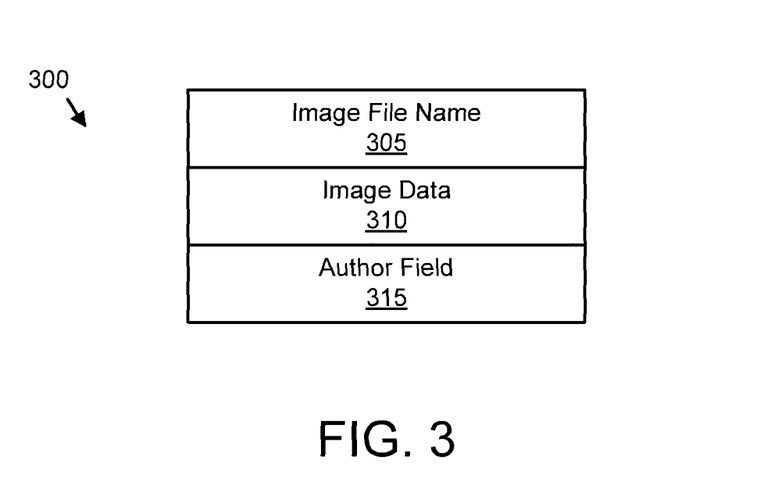
FIG. 3 is a schematic block diagram illustrating one embodiment of an image file.

FIG. 3 is a schematic block diagram illustrating one embodiment of an image file 300. The image file 300 maybe organized as a data structure in a memory. The image file 300 may be stored in the electronic device 110. Alternatively, the image file 300 may be stored on a server 105. In the depicted embodiment, the image file 300 includes an image file name 305, image data 310, and an author field 315. The image file 300 may be a Joint Photographic Experts Group (JPEG) file, a Moving Picture Experts Group (MPEG) file, or the like.

The image file name 305 may specify the filename for the image file 300. The image data 310 may store encoded image data. The author field 315 may record an author of the image file 300.

Figure 4:
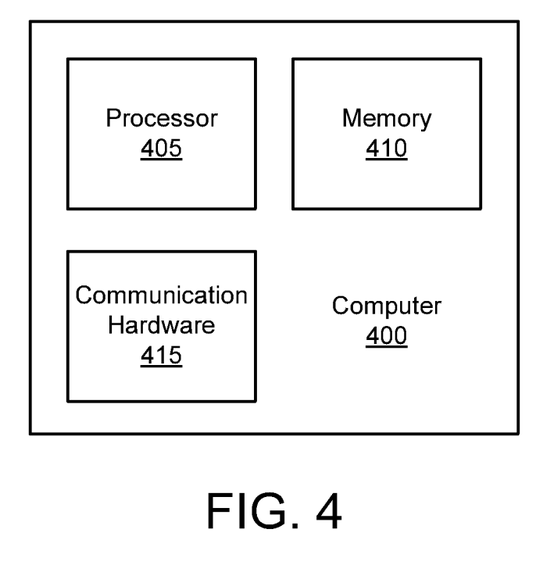
FIG. 4 is a schematic block diagram illustrating one embodiment of a computer.

FIG. 4 is a schematic block diagram illustrating one embodiment of a computer 400. The computer 400 may be embodied in the electronic device 110, the servers 105, or combinations thereof. The computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 of the electronic device 110 may communicate with the network 115.

Figure 5A:
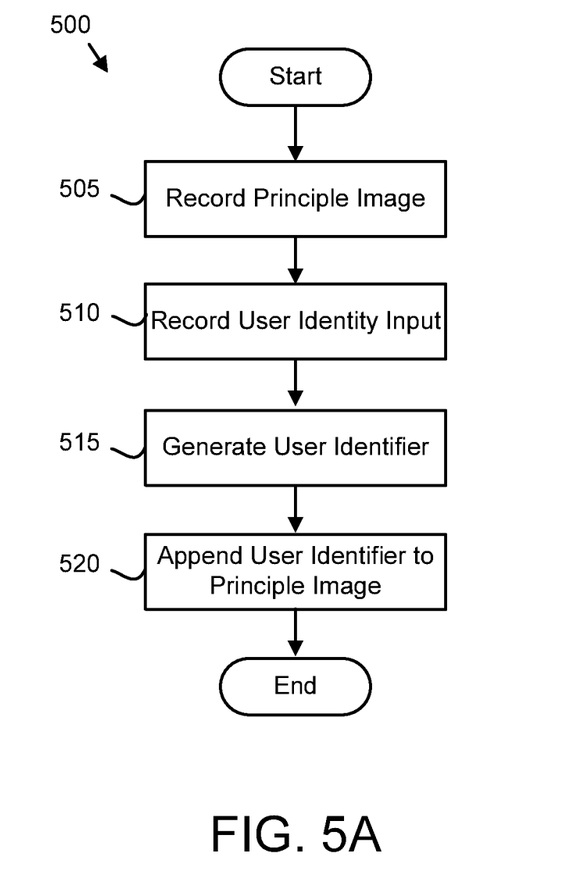
FIG. 5A is a flowchart diagram illustrating one embodiment of a user identifier appending method.

FIG. 5A is a flowchart diagram illustrating one embodiment of a user identifier appending method 500. The method 500 may generate the user identifier 215 from the user identity input 205 and append the user identifier 215 to the image file 300 of the principle image. The method 500 may be performed by the processor 405. Alternatively, the method 500 may be performed by a computer readable storage medium such as the memory 410.

The method 500 starts, and in one embodiment, the code records 505 the principle image. The principle image may be recorded 505 with the principle camera 120. The principle image may be recorded as an image file 300.

The code further records 510 the user identity input 205. The user identity input 205 may be recorded 510 concurrently with recording 505 the principle image. In addition, the user identity input 205 may be recorded by an input device 115 and stored in the user data 200.

In one embodiment, the input device 115 is a second camera such as the forward camera 115*a* and the user identity input 205 is a user image. Alternatively, the input device 115 maybe the touch screen input device 115*b* and the user identity input 205 may be a finger characteristic or an interaction characteristic.

In one embodiment, the user identity input 205 is a biometric such as a user fingerprint, a retinal scan, and the like. The biometric may be captured by the second camera. Alternatively, the user identity input 205 may be a pass code. The pass code may be captured by the touch screen input device 115*b*.

The code may generate 515 the user identifier 215 from the user identity input 205. The user identifier 215 may be generated 515 using facial recognition. The generation 515 of the user identifier 215 from the user identity input 205 is described in more detail in FIG. 5B.

The code may append 520 the user identifier 215 to the principle image and the method 500 ends. In one embodiment, the user identifier 215 is appended 520 to the author field 315 of the image file 300 for the principle image. Alternatively, the user identifier 215 may be appended 520 to the image file name 305 of the image file 300 for the principle image.

In one embodiment, a timestamp is added to the user identifier 215. In addition, the user identifier 215 may be modified to remove spaces.

Figure 5B:
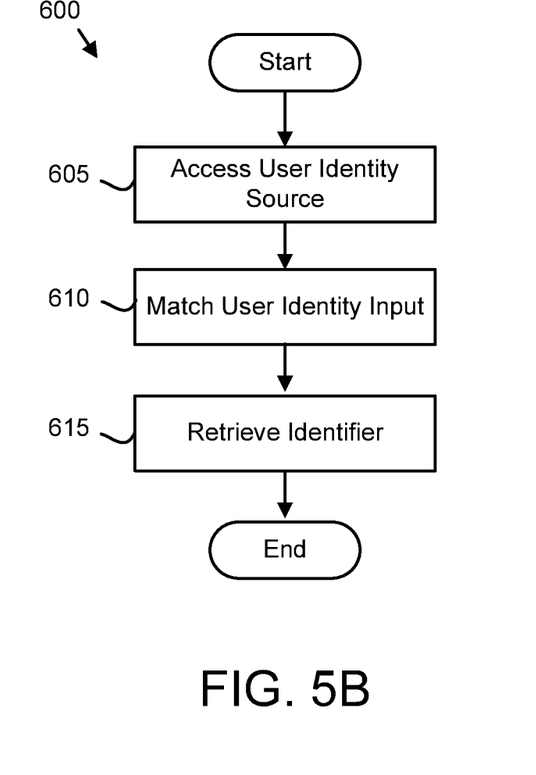
FIG. 5B is a flowchart diagram illustrating one embodiment of an identifier retrieval method.

FIG. 5B is a flowchart diagram illustrating one embodiment of an identifier retrieval method 600. The method 600 may generate the user identifier 215 from the user identity input 205. The method 600 may be performed by the processor 405. Alternatively, the method 600 may be performed by a computer readable storage medium such as the memory 410.

The method 600 starts, and in one embodiment, the code accesses 605 a user identity source such as the user identity database 230 or the user data store 270. In one embodiment, the code employs secure credentials stored on the electronic device 110 to access the user identity source. For example, the code may access a social media account associated with the electronic device 110 and access the user identity database 230 associated with the social media account. Alternatively, the code may access an e-commerce site associated with the electronic device 110.

In one embodiment, the code accesses 605 accesses the user identity source on the third party server 105*c*. The user identity source may be offered as a service to identify images.

The code may match 610 the user identity input 205 to a user input 207. The user identity input 205 may be a user image, a user fingerprint, a user biometric, or a user pass code. The user input 207 may be a social media image user input 207, an image user input 207, a fingerprint user input 207, a biometric user input 207, a pass code user input 207, or the like. In one embodiment, the code identifies a best fit user input 207.

Alternatively, the code may match 610 the user identity input 205 to a data store image 275. The code may identify a best fit data store image 275.

The code may retrieve 615 the user metadata 220 associated with the best fit user input 207 or the image identifier 280 associated with the data store image 275 as the user identifier 215. In one embodiment, the code may parse a name of the user from the user metadata 220 or the image identifier 280. For example, the code may compare the user metadata 220 or the image identifier 280 against a contact list stored on the electronic device 110. The code may select a contact name that matches the user metadata 220 or the image identifier 280 as the user identifier 215. The code may store the user identifier 215 in the user data 200 and the method 600 ends.

The embodiments automatically generate a user identifier 215 from a user identity input 205 for a user recording a principle image with an electronic device 110. In addition, the embodiments automatically append the user identifier 215 to the principle image. As a result, the principal images recorded with the electronic device 110 include the identity of the user/author.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an electronic device comprising:
an input device comprising a second camera;
a principle camera;
a processor; and
a memory that stores code executable by the processor to:
record a user identity input from the input device in response to the principle camera recording a principle image, wherein the user identity input is a user image;
access a social media account associated with the electronic device;

access a user identity database associated with the social media account, wherein the user identity database comprises a plurality of entries, and each entry comprises a user input, an input type, and user metadata;

match the user identity input to a social media image user input with an image type in the user identity database;

generate a user identifier from the social media image user input by retrieving the user metadata for the social media image user input in the user identity database and parsing a name from the user metadata as the user identifier; and append the user identifier to the principle image as a Joint Photographic Experts Group (JPEG) author field.

2. The apparatus of claim 1, wherein the user identifier is further generated by:
accessing a user data store;
matching the user image to a data store image;
retrieving an image identifier for the data store image; and
appending the image identifier to the user identifier.

3. The apparatus of claim 1, wherein the user identity input further comprises a user fingerprint and the user identifier is further generated by:
accessing a user identity database;
matching the user fingerprint to a fingerprint user input;
retrieving user metadata for the fingerprint user input; and
appending the user metadata for the fingerprint user input to the user identifier.

4. The apparatus of claim 1, wherein the user identity input further comprises a pass code and the user identifier is further generated by:
accessing a user identity database;
matching the pass code to a pass code user input; and
retrieving user metadata for the pass code user input; and
appending the user metadata for the pass code user input to the user identifier.

5. The apparatus of claim 1, wherein the user identifier is further appended to a file name of the principle image.

6. A method comprising:
recording, by use of a processor, a user identity input from an input device comprising a second camera in response to a principle camera recording a principle image, wherein the user identity input is a user image;
accessing a social media account associated with the principle camera;
accessing a user identity database associated with the social media account, wherein the user identity database comprises a plurality of entries, and each entry comprises a user input, an input type, and user metadata;
matching the user identity input to a social media image user input with an image type in the user identity database;
generating a user identifier from the social media image user input by retrieving the user metadata for the social media image user input in the user identity database and parsing a name from the user metadata as the user identifier; and
appending the user identifier to the principle image as a Joint Photographic Experts Group (JPEG) author field.

7. The method of claim 6, wherein the user identifier is further generated by:
accessing a user data store;
matching the user image to a data store image;
retrieving an image identifier for the data store image;
appending the image identifier to the user identifier.

8. The method of claim 6, wherein the user identity input further comprises a user fingerprint and the user identifier is further generated by:
accessing a user identity database;
matching the user fingerprint to a fingerprint user input;
retrieving user metadata for the fingerprint user input; and
appending the user metadata for the fingerprint user input to the user identifier.

9. The method of claim 6, wherein the user identity input further comprises a pass code and the user identifier is further generated by:
accessing a user identity database;
matching the pass code to a pass code user input;
retrieving user metadata for the pass code user input; and
appending the user metadata for the pass code user input to the user identifier.

10. The method of claim 6, wherein the user identifier is further appended to a file name of the principle image.

11. A program product comprising a non-transitory computer readable storage medium that stores code executable by a processor, the executable code comprising code to perform:
recording a user identity input from an input device comprising a second camera in response to a principle camera recording a principle image, wherein the user identity input is a user image;
accessing a social media account associated with the principle camera;
accessing a user identity database associated with the social media account, wherein the user identity database comprises a plurality of entries, and each entry comprises a user input, an input type, and user metadata;
matching the user identity input to a social media image user input with an image type in the user identity database;
generating a user identifier from the social media user input by retrieving the user metadata for the social media image user input in the user identity database and parsing a name from the user metadata as the user identifier; and
appending the user identifier to the principle image as a Joint Photographic Experts Group (JPEG) author field.

12. The program product of claim 11, wherein the user identifier is further generated by:
accessing a user data store;
matching the user image to a data store image;
retrieving an image identifier for the data store image; and
appending the image identifier to the user identifier.

* * * * *